3,580,974
NITRILE POLYMERIC BLENDS
Yoon Chai Lee and Quirino A. Trementozzi, Springfield,
Mass., assignors to Monsanto Company, St. Louis, Mo.
No Drawing. Filed Jan. 3, 1969, Ser. No. 788,963
The portion of the term of the patent subsequent to
June 24, 1986, has been disclaimed
Int. Cl. C08f 37/18, 41/12
U.S. Cl. 260—876R                                8 Claims

ABSTRACT OF THE DISCLOSURE

A polymeric blend is prepared from an acrylonitrile/isobutylene copolymer and a methacrylonitrile/isobutylene copolymer. The processing characteristics of the blend are very good, as is the balance of chemical and physical properties exhibited thereby.

BACKGROUND OF THE INVENTION

Although copolymers prepared from a major amount of acrylonitrile and a minor amount of an isobutylene monomer have been found to possess many desirable properties such as high chemical resistance, outstanding gas barrier properties (i.e., resistance to oxygen and water vapor permeation), good rigidity and clarity, their commercial applicability has not been as widespread as it might be. Among the principal limitations are the difficulty with which this type of resin is molded, extruded or otherwise processed and the undesirable coloration which tends to occur in the products produced therefrom.

Numerous processing aids are available, but so far as is known they have not proven entirely satisfactory in acrylonitrile/isobutylene copolymers. Although the processing characteristics of the copolymer may be improved somewhat by the use of such prior art processing aids, normally the levels of improvement achieved are not adequate and/or the presence of the processing aid seriously detracts from the other desirable properties of the resin including chemical and heat resistance, and particularly the gas barrier properties thereof.

Accordingly, it is an object of the present invention to provide novel blends of acrylonitrile/isobutylene copolymers having good processing characteristics and a desirable balance of physical and chemical properties.

It is also an object to provide such blends in which low gas permeability and outstanding processing characteristics are exhibited, and which are adapted to use in packaging and other applications.

Still another object is to provide novel blends containing an acrylonitrile/isobutylene copolymer from which superior molded and extruded products can be produced conveniently and economically.

SUMMARY OF THE INVENTION

It has now been found that the foregoing and related objects may be readily attained in a blend comprising about 55.0 to 90.0 percent of an acrylonitrile copolymer and about 45.0 to 10.0 percent of a methacrylonitrile copolymer. The acrylonitrile copolymer consists essentially of about 65.0 to 95.0 percent of acrylonitrile, about 30.0 to 5.0 percent of an isobutylene monomer and 0 to about 20.0 percent of another monomer copolymerized with the acrylonitrile and isobutylene. The methacrylonitrile copolymer consists essentially of about 55.0 to 97.0 percent of methacrylonitrile, about 3.0 to 20.0 percent of an isobutylene monomer, 0 to about 20.0 percent of another monomer copolymerizable with methacrylonitrile and the isobutylene monomer, and 0 to about 20.0 percent of a rubbery polymeric substrate upon which at least a substantial portion of the methacrylonitrile/isobutylene copolymer is grafted. In all instances, the percentages expressed herein are on a weight basis.

DETAILED DESCRIPTION OF THE PREFERRED EMBODIMENTS

As indicated, the blends of the present invention comprise a major amount of an acrylonitrile/isobutylene copolymer and a minor amount of a methacrylonitrile/isobutylene copolymer physically admixed therewith. The acrylonitrile polymer may comprise about 55.0 to 90.0 percent of the blend, and preferably the concentration thereof is about 65.0 to 80.0 percent. The methacrylonitrile copolymer is about 45.0 to 10.0 percent, and preferably about 35.0 to 20.0 percent, of the weight of the blend. In addition to these two essential components, other polymers, impact modifiers, inert fillers, stabilizers, plasticizers, pigments, etc., may be incorporated in the blends of the present invention.

Although the preferred compositions utilize acrylonitrile copolymers containing only acrylonitrile and the isobutylene monomer, interpolymers containing up to about 20.0 percent, and preferably no more than about 15.0 percent by weight, of a copolymerized monomer may also be employed. The monomers which are suitable include other ethylenically unsaturated nitriles (e.g., methacrylonitrile, ethacrylonitrile and propacrylonitrile), monovinylidene aromatic hydrocarbons (e.g., styrene; ar-alkylstyrenes, such as the o-, m-, and p-methylstyrenes, 2,4-dimethylstyrene, ar-ethylstyrenes, p-t-butylstyrene, etc.; alpha-alkylstyrenes, such as alpha-methylstyrene, alpha-ethylstyrene, alpha-methyl-p-methylstyrene, etc.; vinyl naphthalene; and mixtures thereof), alkyl(alk) acrylates (e.g., methylacrylate, ethyl acrylate, propyl acrylate, butyl acrylate, 2-ethylhexyl acrylate, the corresponding alkyl methacrylates, etc., and mixtures thereof), acrylamides (e.g., acrylamide; methacrylamide; N-alkyl acrylamides such as N-methylacrylamide, N-butyl acrylamide, etc.; and mixtures thereof), dialkylmaleates and fumarates (e.g., diethyl maleate, dibutyl fumarate, etc., and mixtures thereof), etc.

Of the various monomers which may be copolymerized with the acrylonitrile and isobutylene to form an interpolymer, the preferred compounds are selected from the group consisting of ethylenically unsaturated nitriles other than acrylonitrile (particularly methacrylonitrile), styrene, alpha-alkyl styrenes (particularly alpha-methylstyrene), ring chlorinated analogs of styrene and alpha-alkyl styrenes, (alk)acrylic acids, (alk)acrylic esters, vinyl esters and mixtures thereof. Particularly good results from the standpoint of processing characteristics are obtained by the use of vinyl esters and acrylic esters.

The isobutylene monomer in both the acrylonitrile and the methacrylonitrile copolymers may be isobutylene, diisobutylene, or a mixture thereof. It should be understood that the term "diisobutylene" is intended to encompass the various isomeric forms of dimers of isobutylene, such as 2,4,4-trimethylpentene-1, and that the phrase "isobutylene monomer" refers to further polymerizable materials and encompasses the dimers of isobutylene. Generally, the acrylonitrile copolymers most beneficially employed in the present invention have weight average molecular weights of about 150,000 to 300,000.

As in the case of the acrylonitrile copolymer, the methacrylonitrile copolymer may contain only methacrylonitrile and the isobutylene monomer or it may be an interpolymer containing up to about 20.0, and preferably no more than about 15.0 percent by weight of another copolymerizable monomer. The same group of monomers which is suitable in the acrylonitrile copolymers is also suitable in the methacrylonitrile copolymers, with the exception of the vinyl esters which do not copolymerize to an appreciable extent with methacrylonitrile. Also, the class of copolymerizable monomers used in the methacrylonitrile copolymer includes ethylentically unsaturated nitriles other than methacrylonitrile, as is true of the group of monomers used in the acrylonitrile copolymer.

The methacrylonitrile copolymer may contain up to about 20.0 percent, and preferably not more than about 15.0 percent by weight of a preformed rubbery polymer upon which a portion of the methacrylonitrile, isobutylene and comonomer may be grafted; normally, the minimum effective amount of such a polymer in the methacrylonitrile copolymer is about 5.0 percent. The graft copolymers are produced in accordance with conventional practice by polymerizing the monomeric constituents in the presence of the preformed rubber so as to cause a portion of the interpolymer to graft onto the rubbery polymer backbone or substrate. Numerous rubbery polymers may be used for this purpose but, for best results, it is highly desirable that the rubber substrate be unsaturated so as to facilitate grafting. Exemplary of suitable graft substrates are the synthetic diene rubbers, natural rubbers, ethylene-propylene terpolymer rubbers (such as those made with dicyclopentadiene, etc.), other rubbery olefin interpolymers such as ethylene-vinyl acetate and ethylene-octyl acrylate, other acrylate rubbers (such as butyl acrylate and 2-ethylhexyl acrylate), synthetic isoprene rubbers, and mixtures thereof. It will be appreciated that such rubbers include not only homopolymers of the specifically identified constituents but also interpolymers which may be characterized primarily as the aforementioned rubbers.

The preferred substrates, however, are diene rubbers (including mixtures with diene rubbers), i.e., any rubbery polymer (a polymer having a second order transition temperature not higher than 0° centigrade, preferably not higher than —20° centigrade, as determined by ASTM Test D–746–52T) of one or more of the conjugated 1,3-dienes, e.g., butadiene, isoprene, piperylene, chloroprene, etc. Such rubbers include homopolymers and interpolymers of conjugated 1,3-dienes with up to an equal amount of weight of one or more copolymerizable monoethylenically unsaturated monomers such as monovinylidene aromatic hydrocarbons (e.g., styrene; an ar-alkylstyrene, such as the o-, m- and p-methylstyrenes, 2,4-dimethylstyrene, the ar-ethylstyrenes, p-tert-butylstyrene, etc.; an alpha-methylstyrene, alpha-ethylstyrene, alpha-methyl-p-methylstyrene, etc.; vinyl naphthalene, etc.); ar-halo monovinylidene aromatic hydrocarbons (e.g., the o-, m- and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; and the like.

A preferred group of rubbers are those consisting essentially of 65.0–100.0 percent by weight of butadiene and/or isoprene and up to 35.0 percent by weight of a monomer selected from the group consisting of monovinylidene aromatic hydrocarbons (e.g., styrene), and ethylenically unsaturated nitriles (e.g., acrylonitrile) or mixtures thereof. Particularly advantageous substrates are butadiene homopolymers or interpolymers of 75.0–95.0 percent by weight butadiene and 5.0–25.0 percent by weight of acrylonitrile or styrene.

The copolymers and interpolymers employed in accordance with this invention may be prepared by any suitable method conventionally employed for the production of polymers of that type. Thus, the polymers may be prepared en masse, in solution, in suspension, emulsion or by a combined mass/suspension technique; however, the aqueous dispersion techniques are preferred.

Conventional agents for forming an emulsion of the monomers in water will be employed in the case of an emulsion polymerization process, exemplary of which are the fatty acid soaps, alkali metal or ammonium soaps of high molecular weight alkyl or alkaryl sulfonates and sulfates, etc. On the other hand, if a suspension technique is employed, suitable suspension acids include the alkali-metal salts of organic sulfonic acids, alkyl phenol/polyhydric alcohol condensation products, oil-soluble quaternary ammonium salts, water-soluble cellulose derivatives, etc.

Although thermally initiated reactions may be feasible, preferably a small amount of a catalytic initiator is employed. Actinic radiation and both water-soluble and monomer-soluble peroxy-type catalysts with or without a reducing agent to form a redox system may be used for the polymerization reaction with variable efficacy depending upon the particular polymerization technique employed. In some emulsion polymerization processes, it is advantageous to use a redox system since it permits the use of slower catalysts with equivalent conversion periods.

Exemplary of the water-soluble peroxy catalysts are the alkali metal peroxides; the alkali metal and ammonium persulfates, perborates, peracetates and percarbonates; and hydrogen peroxide. Exemplary of the monomer-soluble peroxy and perazo compounds are di-tert-butyl peroxide, di-benzoyl peroxide, di-lauroyl peroxide, di-oleyl peroxide, di-toluyl peroxide, di-tert-butyl diperphthalate, tert-butyl peracetate, di-tert-butyl perbenzoate, dicumyl peroxide, di-tert-butyl peroxide, di-isopropyl peroxydicarbonate, 2,5 - dimethyl - 2,5 - di(tert-butylperoxy)hexane, 2,5-dimethyl-2,5-di(tert-butylperoxy)hexyne-3, di-tert-butyl hydroperoxide, cumene hydroperoxide, p-menthane hydroperoxide, cyclo-pentane hydroperoxide, diisopropylbenzene hydroperoxide, p-tert-butyl-cumene hydroperoxide, pinane hydroperoxide, 2,5-dimethylhexane-2,5-dihydroperoxide, etc.; azo-di-isobutyronitrile and mixtures thereof.

The catalyst is generally included within the range of 0.001 to 2.0 percent by weight, and preferably on the order of 0.005 to 1.0 percent by weight of the polymerizable material, depending upon the monomers, the polymerization technique, and the desired polymerization cycle. An excess of catalyst during the initial period of polymerization will tend to favor the grafting reaction if a rubbery substrate is included.

Exemplary of the reducing agents which may be employed are alkali metal and ammonium sulfites, hydrosulfites, metabisulfites, thiosulfates, sulfinates, formaldehyde-sulfoxylates or ascorbic acid, dioxyacetone, dextrose, etc. Various other reducing agents for redox systems may also be employed.

The amount of reducing agent will be about 0.001 to 1.0 percent by weight, and preferably on the order of 0.005 to 0.5 percent by weight, of the polymerizable monomer formulation, depending on the catalyst and the amount thereof. For redox systems, minute amounts of activators or promoters such as ferrous salts, cobalt and copper salts may be included.

Although it is possible to achieve substantially complete conversion of monomer to polymer (i.e., 100 percent) in certain of the formulations described herein, normally it is most economical and convenient to terminate the reaction short of completion, at about 85.0 to 90.0 percent conversion; generally the percentage of monomer converted will not be less than about 65.0. The cycle times for the reaction may vary widely and will depend upon the particular technique, reactants and initiator employed, but usually the reaction will be considered complete at the end of about a 5 to 24 hour period. The suitable temperature for reaction may also vary considerably, but will usually fall within the range of about 50° to 150° centigrade.

Molecular weight regulators may be included in the formulation for the polymerization reaction so as to control the molecular weight and achieve the desired properties. Exemplary of such molecular weight regulators are the higher alkyl mercaptans and terpenes, specifically n-dodecyl mercaptan, terpinolene, d-limonene, etc.

The blends of the present invention may be comprised solely of the acrylonitrile copolymer and the methacrylonitrile copolymer intimately admixed; however, significant advantages may often be realized when additional components are included in the blends. If the methacrylonitrile copolymer does not contain a rubber component, it may be desirable to admix an impact modifier with the other two components to improve the physical properties of the products produced from the blends. In such a case the impact modifier may be one of the previously mentioned rubbers evidencing sufficient compatibility, or preferably a graft copolymer such as the ABS (acrylonitrile and styrene grafted upon a rubbery diene substrate) and MBS (methyl methacrylate and styrene grafted upon a rubbery diene substrate). Regardless of the source or mode of introduction of the rubbery polymer, the total amount thereof should not exceed about 20.0 percent of the total weight of the blend; preferably the amount thereof will not be in excess of about 15.0 weight percent.

Other optional additives may be included in the blends of the invention, such as fillers, plasticizers, stabilizers, antioxidants, and lubricants. The desirability of such additives will depend upon the characteristics of the blend and upon the optimum balance between economy and properties which can be obtained thereby.

The final polymer blends may be prepared by admixing the components thereof in any of the customary ways including mill rolling, extrusion blending, high intensity mixing, etc. When the polymers are prepared by emulsion processes, the latices thereof may be admixed and the mixed latex spray dried or coagulated. It will be appreciated that the blends may be formed in the equipment for forming the product to be made therefrom such as an extruder when the resin components are of the desired particulate form.

Exemplary of the efficacy of the present invention are the following specific examples wherein all parts and percentages are on a weight basis unless otherwise specified.

EXAMPLE 1

An acrylonitrile copolymer and a methacrylonitrile copolymer are independently prepared by free-radical initiated suspension polymerization reactions. In both instances a ditertiary butyl peroxide catalyst is used and the reaction is effected at about 125° centigrade to about 85.0 to 90.0 percent completion; this requires approximately eight hours. The acrylonitrile copolymer contains about 72.0 percent of acrylonitrile, about 28.0 percent of isobutylene, and about 68.0 parts of this copolymer are admixed with about 32.0 parts of a methacrylonitrile copolymer containing about 93.0 percent of methacrylonitrile and 7.0 percent of isobutylene. The admixture is intimately blended in a Banbury mixer, and, after the blend is solidified and finely divided, a portion thereof is subjected to testing in a capillary rheometer.

In the rheometer, the diameter of the capillary used is 0.0495 inch, the length: diameter ratio is 10:1 and the entrance angle is 90°; the temperature of the material during the test is maintained at about 380° Fahrenheit. The specimens are tested at three shear rates, i.e., 10, 100 and 1000 second$^{-1}$, and the force necessary to maintain these rates is measured. Utilizing this information, the shear stresses and the apparent viscosity of the specimens are determined at each shear rate, and these data are compared with data similarly obtained utilizing specimens of the acrylonitrile/isobutylene copolymer by itself. As a result, it is found that the blend of the acrylonitrile and methacrylonitrile copolymers has significantly lower shear stress and apparent viscosity than the acrylonitrile copolymer alone at each shear rate, indicating the significantly improved level of processability in the blend (the lower the shear stress and apparent viscosity, the better is the processability of the material tested).

Comparative gas permeation tests are also performed utilizing films formed in a heated hydraulic press from portions of the blend and from the acrylonitrile polymer alone; in no case is the resistance to the passage of gas (i.e., oxygen and water vapor) significantly impaired by the presence of the methacrylonitrile copolymer. Thus, it can be seen that the blend provides a film suitable for use as a packaging material where oxygen and water barrier characteristics are required.

In addition, molded articles are tested for chemical resistance by exposure to sulfuric acid; their resistance to attack is found to be substantially equal to that of the acrylonitrile copolymer alone. In all molded products, the clarity is very good and the color formation as a result of degradation is noticeably less in the blend than in the acrylonitrile copolymer alone.

EXAMPLE 2

The preparation and testing procedures of Example 1 are substantially repeated, with the exception that about 10.0 percent, based upon the weight of the final blend, of an ethylene/vinyl acetate copolymer rubber is blended with the acrylonitrile copolymer and methacrylonitrile copolymer in the Banbury mixer. This blend is found to possess substantially the same properties as the blend of Example 1, however the toughness thereof is improved significantly.

EXAMPLE 3

The procedures of Example 1 are substantially repeated using interpolymers of different composition. About 80.0 parts of an acrylonitrile interpolymer containing about 75.0 percent of acrylonitrile, about 15.0 percent of isobutylene and about 10.0 percent of vinyl acetate is blended with about 20.0 parts of a methacrylonitrile graft polymer obtained by polymerizing about 83.0 parts methacrylonitrile and about 5.0 parts isobutylene in the presence of about 12.0 percent of a preformed butadiene/acrylonitrile (80/20) rubber. This blend is found to be highly processable and yet to exhibit an improved level of toughness; it also exhibits outstanding resistance to gas permeation and chemical attack, and products molded therefrom are very clear and somewhat improved in coloration as compared to the acrylonitrile copolymer alone.

EXAMPLE 4

A blend which exhibits not only improved processing characteristics and maintained physical and chemical properties, but also good stability against deterioration at elevated temperatures is prepared by admixing about 72.0 parts of the acrylonitrile/isobutylene copolymer of Example 1 with about 28.0 parts of an interpolymer of a methacrylonitrile/acrylonitrile/isobutylene (90.0:5.0:5.0)

combination. This blend is tested in comparison with the blend of Example 1 and is found to have comparable physical, chemical and gas barrier properties; however it can be processed at higher temperatures before evidence of deterioration is encountered therein.

Thus, it can be seen that the present invention provides novel physical blends of acrylonitrile copolymers and methacrylonitrile copolymers having outstanding processing characteristics wherein the balance of physical and chemical properties is very good. The desirable processing characteristics are coupled with improved or maintained resistance to gas permeation to provide materials highly advantageous for packaging and other applications, and the blends provided can be molded and extruded con-

What is claimed is:

1. A nitrile polymer blend comprising about 55.0 to 90.0 percent of an acrylonitrile copolymer and about 45.0 to 10.0 percent of a methacrylonitrile copolymer; said acrylonitrile copolymer consisting essentially of about 65.0 to 95.0 percent of acrylonitrile, about 30.0 to 5.0 percent of an isobutylene monomer selected from the group consisting of isobutylene, diisobutylene and mixtures thereof, and 0 to about 20.0 percent of another monomer copolyerizable with said acrylonitrile and isobutylene monomer and selected from the group consisting of methacrylonitrile, ethacrylonitrile, propacrylonitrile, monovinylidene aromatic hydrocarbons, ring-chlorinated analogs of styrene and alpha-alkyl styrenes, (alk) acrylic acids, vinyl esters, alkyl (alk) acrylates, acrylamides, N-alkyl acrylamides, dialkyl maleates and dialkyl fumarates, and mixtures thereof; said methacrylonitrile copolymer consisting essentially of about 55.0 to 97.0 percent of methacrylonitrile, about 3.0 to 20.0 percent of an isobutylene monomer selected from the group consisting of isobutylene, diisobutylene and mixtures thereof, 0 to about 20.0 percent of another monomer copolymerizable with said methacrylonitrile and isobutylene compound and selected from the group consisting of acrylonitrile, ethacrylonitrile, propacrylonitrile, monovinylidene aromatic hydrocarbons, ring-chlorinated analogs of styrene and alpha-alkyl styrenes, (alk) acrylic acids, alkyl (alk) acrylates, acrylamides, N-alkyl acrylamides, dialkyl maleates and dialkyl fumarates, and mixtures thereof; and 0 to about 20.0 percent of an unsaturated rubbery polymeric substrate selected from the group consisting of diene rubbers, natural rubbers, ethylene-propylene, terpolymer rubbers, rubbery olefin interpolymers, acrylate rubbers, isoprene rubbers, and mixtures thereof upon which rubber at least a portion of the methacrylonitrile/isobutylene copolymer is grafted, all of said percentages being on a weight basis.

2. The blend of claim 1 comprising about 65.0 to 80.0 percent of said acrylonitrile copolymer and about 35.0 to 20.0 percent of said methacrylonitrile copolymer.

3. The blend of claim 1 wherein said acrylonitrile copolymer consists essentially of about 70.0 to 85.0 percent of acrylonitrile, about 25.0 to 10.0 percent of said isobutylene monomer and 0 to about 15.0 percent of copolymerized monomer; and wherein said methacrylonitrile copolymer consists essentially of about 70.0 to 95.0 percent of methacrylonitrile, about 5.0 to 10.0 percent of said isobutylene monomer, 0 to about 15.0 percent of said copolymerized monomer and 0 to about 15.0 percent of said polymeric substrate.

4. The blend of claim 2 wherein said acrylonitrile copolymer consists essentially of acrylonitrile and isobutylene, and wherein said methacrylonitrile copolymer consists essentially of methacrylonitrile, isobutylene and 0 to 15.0 percent of a rubbery diene polymeric substrate.

5. The blend of claim 1 wherein said acrylonitrile copolymer has a weight average molecular weight of about 150,000 to 300,000.

6. The blend of claim 1 wherein said monomer copolymerized in said acrylonitrile copolymer is selected from the group consisting of ethylenically unsaturated nitriles, styrene, alpha-alkyl styrenes, ring chlorinated analogs of styrene and alpha-alkyl styrenes, acrylic acids, acrylic esters, vinyl esters, and mixtures thereof.

7. The blend of claim 1 wherein said monomer copolymerized in said methacrylonitrile copolymer is selected from the class consisting of copolymerizable ethylenically unsaturated nitriles, styrene, alpha-alkyl styrenes, ring chlorinated analogs of styrene and alpha-alkyl styrenes, acrylic acids, acrylic esters, and mixtures thereof.

8. The blend of claim 7 wherein said monomer of said class is acrylonitrile.

References Cited
UNITED STATES PATENTS

| | | | |
|---|---|---|---|
| 2,802,809 | 8/1957 | Hayes | 260—876X |
| 3,451,538 | 6/1969 | Trementozzi | 260—876X |

MURRAY TILLMAN, Primary Examiner

H. ROBERTS, Assistant Examiner

U.S. Cl. X.R.

260—4R, 878R, 879, 880R, 885, 896, 898

PO-1050
(5/69)

UNITED STATES PATENT OFFICE
CERTIFICATE OF CORRECTION

Patent No. 3,580,974          Dated May 25, 1971

Inventor(s) Yoon C. Lee and Quirino A. Trementozzi

It is certified that error appears in the above-identified patent and that said Letters Patent are hereby corrected as shown below:

At Column 4, line 29, "di-tert-butyl perbenzoate" should read - - - tert-butyl perbenzoate - - -.

At Column 4, lines 32 and 33, "di-tert-butyl hydroperoxide" should read - - - tert-butyl hydroperoxide - - -.

In addition, Column 4, line 29, "tert-butyl peracetate" should read -- di-tert-butyl peracetate --.

Signed and sealed this 30th day of November 1971.

(SEAL)
Attest:

EDWARD M. FLETCHER, JR.          ROBERT GOTTSCHALK
Attesting Officer                Acting Commissioner of Patents